US009277531B2

(12) United States Patent
Tiirola et al.

(10) Patent No.: US 9,277,531 B2
(45) Date of Patent: Mar. 1, 2016

(54) DOWNLINK INTER-CELL INTERFERENCE CANCELLATION WITH CELL AGGREGATION COORDINATED MULTI-POINT

(75) Inventors: Esa Tapani Tiirola, Kempele (FI); Kari Pekka Pajukoski, Oulu (FI); Timo Erkki Lunttila, Espoo (FI); Matti Tapani Kiiski, Oulunsalo (FI); Olav Tirkkonen, Helsinki (FI)

(73) Assignee: Nokia Solutions and Networks Oy, Espoo (FI)

( * ) Notice: Subject to any disclaimer, the term of this patent is extended or adjusted under 35 U.S.C. 154(b) by 356 days.

(21) Appl. No.: 13/363,780

(22) Filed: Feb. 1, 2012

(65) Prior Publication Data

US 2013/0196701 A1    Aug. 1, 2013

(51) Int. Cl.
  *H04B 1/00*    (2006.01)
  *H04W 72/00*    (2009.01)
  *H04J 11/00*    (2006.01)

(52) U.S. Cl.
  CPC ........... *H04W 72/00* (2013.01); *H04J 11/0026* (2013.01); *H04J 11/0059* (2013.01)

(58) Field of Classification Search
  CPC .............. H04W 72/082; H04W 92/20; H04W 72/0406; H04W 72/04
  USPC ................... 455/415, 522, 63.1, 114.2, 278.1
  See application file for complete search history.

(56) References Cited

U.S. PATENT DOCUMENTS

2010/0255852 A1*    10/2010    Chen et al. ..................... 455/450
2012/0122472 A1*    5/2012    Krishnamurthy et al. . 455/456.1

FOREIGN PATENT DOCUMENTS

EP    2333983 A1    6/2011

OTHER PUBLICATIONS

Yu, C. et al.; "Distributed Inter-Cell Interference Coordination based on Rate Splitting"; 2010; pp. 711-715; IEEE.
Catt; "Paging and downlink transmission for MTC"; 3GPP TSG RAN WG2 Meeting #70, Montreal, Canada, May 10-14, 2010; pp. 1-3; 3GPP Draft R2-102781.
LG Electronics; "Multi-layered Rate Control for SIC-based CoMP"; 3GPP TSG RAN WG1 Meeting #58, Shenzhen, China, Aug. 24-28, 2009; pp. 1-9; 3GPP Draft R1-093239.
R1-093239, 3GPP TSG RAN WG1 Meeting #58, Shenzhen, China, Aug. 24-28, 2009, LG Electronics, "Multi-Layered Rate Control for SIC-based CoMP", (9 pages).
Yu, et al., "Distributed Inter-Cell Interference Coordination Based on Rate Splitting", IEEE, (2010), (pp. 711-715).
Nokia Siemens Networks, "2020: Beyond 4G Radio Evolution for the Gigabit Experience", (2011), (16 pages).

* cited by examiner

*Primary Examiner* — Tu X Nguyen
(74) *Attorney, Agent, or Firm* — Harrington & Smith (57) ABSTRACT

A method includes receiving at a user equipment from a network access node a temporary identifier associated with an interference cancellation group to which the user equipment is assigned; decoding a control channel using the temporary identifier to determine a downlink resource allocation for the user equipment and to determine a downlink resource allocation for at least one other user equipment assigned to the same interference cancellation group; and receiving a downlink signal in accordance with the determined downlink resource allocation for the user equipment while canceling interference from the downlink signal that is associated with the at least one other user equipment by using the determined downlink resource allocation for the at least one other user equipment. Apparatus for performing the method are also disclosed.

13 Claims, 8 Drawing Sheets

DOWNLINK INTER-CELL INTERFERENCE CANCELLATION WITH CELL AGGREGATION COORDINATED MULTI-POINT

TECHNICAL FIELD

The exemplary and non-limiting embodiments of this invention relate generally to wireless communication systems, methods, devices and computer programs and, more specifically, relate to interference cancellation techniques, CoMP and cell aggregation.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:
B4G Beyond 4G
CQI Channel Quality Indicator
C-RNTI Cell Radio Network Temporary Identifier
CoMP Coordinated Multi-Point
DMRS Demodulation Reference Signal
ePDCCH enhanced PDCCH
CRS Common Reference Signal
CSI Channel State Information
DCI Downlink Control Information
DL Downlink
eNB eNode B (Base Station)
IC Interference cancellation
IRC Interference Rejection Combining
LTE Long Term Evolution
MCS Modulation and Coding Scheme
MIMO Multiple-Input and Multiple-Output
MU-MIMO Multi-User MIMO
PDCCH Physical Downlink Control Channel
PDSCH Physical Downlink Shared Channel
PRB Physical Resource Block
RRC Radio Resource Control
RRM Radio Resource Management
SIC Serial Interference Cancellation, Successive Interference Cancellation
UE User Equipment
UE_id UE identification One document of general interest herein is 3GPP TSG RAN WG1 Meeting #58, R1-093239 Shenzhen, China Aug. $24^{th}$-$28^{th}$, 2009 Agenda item: 15.2, Source: LG Electronics, Title: Multi-layered Rate Control for SIC-based CoMP.

Another document of general interest herein is: Distributed Inter-Cell Interference Coordination based on Rate Splitting, Chia-Hao Yu and Olav Tirkkonen, Wireless Communication Systems (ISWCS), 2010 7th International Symposium, pgs. 711-715, 19-22 Sep. 2010.

SUMMARY

In a first aspect thereof the exemplary embodiments of this invention provide a method that comprises receiving at a user equipment from a network access node a temporary identifier associated with an interference cancellation group to which the user equipment is assigned; decoding a control channel using the temporary identifier to determine a downlink resource allocation for the user equipment and to determine a downlink resource allocation for at least one other user equipment assigned to the same interference cancellation group; and receiving a downlink signal in accordance with the determined downlink resource allocation for the user equipment while canceling interference from the downlink signal that is associated with the at least one other user equipment by using the determined downlink resource allocation for the at least one other user equipment.

In another aspect thereof the exemplary embodiments of this invention provide an apparatus that comprises a processor and a memory including computer program code. The memory and computer program code are configured to, with the processor, cause the apparatus at least to receive at a user equipment from a network access node a temporary identifier associated with an interference cancellation group to which the user equipment is assigned; to decode a control channel using the temporary identifier to determine a downlink resource allocation for the user equipment and to determine a downlink resource allocation for at least one other user equipment assigned to the same interference cancellation group; and to receive a downlink signal in accordance with the determined downlink resource allocation for the user equipment and to cancel interference from the downlink signal that is associated with the at least one other user equipment by using the determined downlink resource allocation for the at least one other user equipment.

In yet another aspect thereof the exemplary embodiments of this invention provide a method that comprises assigning a plurality of user equipment to an interference cancellation group having an associated temporary identifier; informing the user equipment of the interference cancellation group of the temporary identifier; and transmitting on a control channel a plurality of downlink control information corresponding to the plurality of user equipment assigned to the interference cancellation group. Each of the downlink control information contains a unique identifier of one of the plurality of user equipment and at least a downlink resource allocation grant for the user equipment. In the method the step of transmitting encodes the plurality of downlink control information using the associated temporary identifier.

In a still further aspect thereof the exemplary embodiments of this invention provide an apparatus that comprises a processor and a memory including computer program code. The memory and computer program code are configured, with the processor, cause the apparatus at least to assign a plurality of user equipment to an interference cancellation group having an associated temporary identifier; to inform the user equipment of the interference cancellation group of the temporary identifier; and to transmit on a control channel a plurality of downlink control information corresponding to the plurality of user equipment assigned to the interference cancellation group, each downlink control information containing a unique identifier of one of the plurality of user equipment and at least a downlink resource allocation grant for the user equipment, where transmitting encodes the plurality of downlink control information using the associated temporary identifier.

BRIEF DESCRIPTION OF THE DRAWINGS

The foregoing and other aspects of the exemplary embodiments of this invention are made more evident in the following Detailed Description, when read in conjunction with the attached Drawing Figures, wherein.

DETAILED DESCRIPTION

The exemplary embodiments of this invention relate generally to what may be called a Beyond 4G (B4G) radio system which may be assumed will not be commercially available for several years. However, certain aspects of this invention may find applicability in 3GPP specifications as an evolution of LTE-Advanced, e.g., in Release 12 (Rel-12) and beyond. More specifically, the exemplary embodiments are directed to an enhanced CoMP technique, namely an interference cancellation arrangement that is applicable to, for example, cell aggregation CoMP. Another CoMP scheme applicable to this invention is LTE multiflow in which the UE receives two data flows via two cells operating on the same carrier. LTE multiflow may involve limited backhaul capability as compared to cell aggregation CoMP.

As such, and while the exemplary embodiments of this invention will be described below primarily in the context of cell aggregation CoMP, it should be appreciated that cell aggregation CoMP and multiflow are just two non-limiting examples of applicable CoMP schemes. In principle the exemplary embodiments of this invention are applicable to various CoMP schemes having different backhaul capabilities between different involved nodes/Tx points. Furthermore, the examples of embodiments of this invention can be applied also in the context of single-cell, e.g., non-orthogonal access and MU-MIMO.

Figure 1:
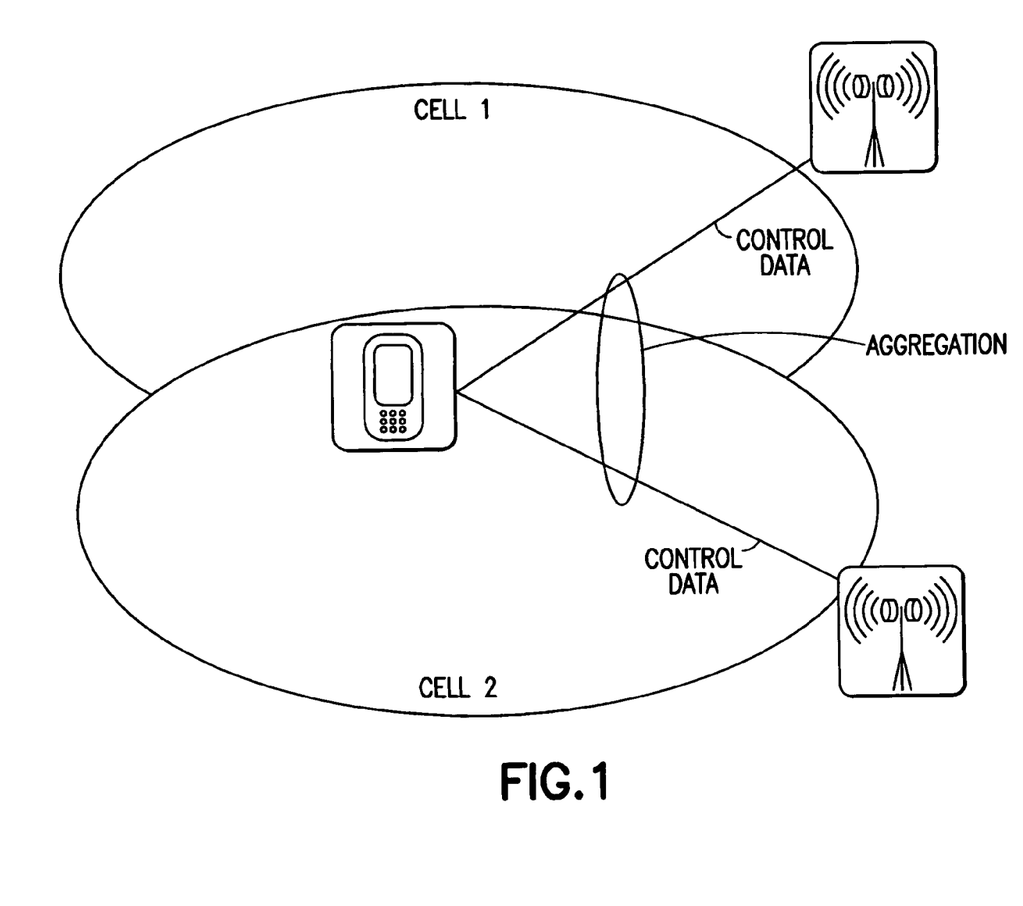
FIG. 1 shows the principle of cell aggregation.

The general principle of cell aggregation CoMP is shown in FIG. 1. Cell aggregation CoMP uses some control plane (CP) functionality from the carrier aggregation (CA) framework specified in LTE Rel-10. One difference as compared to CA is that one UE is permitted to aggregate multiple serving cells (e.g., Cell 1 and Cell 2 in FIG. 1) with the same carrier frequency. The CA framework can be reused for, as one non-limiting example, dynamic cell selection. The CA framework also allows for the decoupling of UL and DL cells (cross-cell scheduling). Additional advantages of CA CoMP are that it is compatible with a regular infrastructure and it is applicable to both CRS-based and DMRS-based transmission modes.

Figure 2:
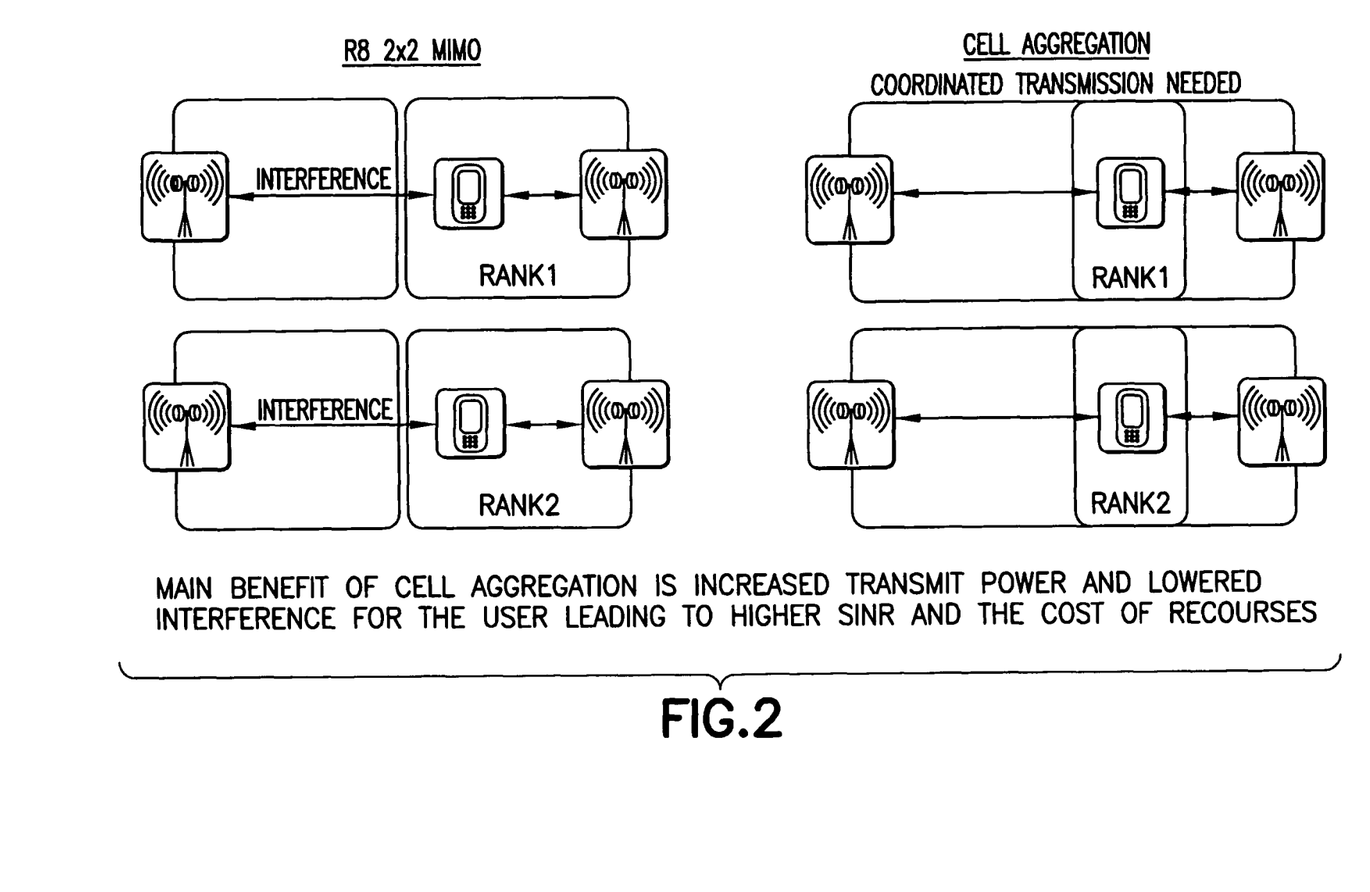
FIG. 2 shows a comparison of Rel-8 2×2 MIMO and cell aggregation joint transmission.

One general problem that is encountered is that the CA joint transmission does not provide significant gain in the DL as compared to dual stream transmission in a single cell. Reference in this regard can be made to FIG. 2, where R* 2×2 MIMO refers to Rel-8 2×2 MIMO operation. Some cell edge spectral efficiency gain (e.g., in the range from about 10% to about 20%) as compared to baseline can be achieved via dynamic cell selection.

It is known that CoMP provides significant gains in the UL (e.g., up to about 40% for the average throughput and up to about 80% for the cell edge throughput with two Rx (receive) antennas per cell). There are several reasons that explain the different behavior in the UL and in the DL.

First, the number of receiving antennas is typically higher in the UL side as there is basically no upper limit for the number of Rx antennas at the base station, e.g., at the eNB. Furthermore, correlation between the receiving antennas is low.

Second, IC receivers can be more easily employed in the UL side, as this is basically an implementation choice.

Third, UL CoMP is basically free from additional overhead whereas joint transmission in the DL increases the reference signal overhead which reduces the gain. Note, however, that this overhead issue is not present with dynamic cell selection.

The problem that arises is thus how to obtain larger CoMP gains also in the DL side (especially in the context of CA CoMP). Note that non-linear receivers may have a significant role to play in reaching this goal. Hence, one problem that is considered and addressed by the exemplary embodiments of this invention is how to best support IC receivers in the context of CA CoMP. Related to this, what is addressed is the maximization of the capability to receive a signal at the UE simultaneously via multiple cells.

The basic principle of inter-cell interference mitigation, e.g., by means of IRC (Interference Rejection Combining), is known in the art. The use of IRC can provide more efficient inter-cell interference cancellation at the UE, and may rely on, e.g., DM-RS. In this case the UE needs to be provided with some means to "access" DM-RS sequences of potential interferers (sequence allocation/initialization and/or signaling) in order to perform IC. Non-orthogonal access may be useful in, e.g., HetNet (heterogeneous network) deployments.

The use of inter-cell interference mitigation access can also provide an enhanced means to identify co-channel interference (e.g., resource allocation, DM-RS ports, MCS of interfering UEs signaled to the target UE). Related to this is complex signaling with gains mainly due to soft and/or coded SIC operation.

The use of inter-cell interference mitigation can also provide large gains from UE-based interference cancellation available mainly in high dominant to rest of interference ratio (or more generally Dominant Interference Ratio-DIR) scenarios.

It can be noted that while the problem setting has been explained thus far in the context of inter-cell interference mitigation (e.g., on top of CoMP), intra-cell interference mitigation is also addressed by the examples of embodiments of this invention. The intra-cell interference mitigation basically covers, e.g., MU-MIMO scheduling and non-orthogonal access. It is also noted that certain CoMP schemes permit having the same cell identification for multiple spatially separated Tx/Rx points (such as radio remote heads, RRHs). The embodiments of this invention are equally applicable to these and other types of operational scenarios.

The gains of inter-cell IC are difficult to realize in practice, as in many cases the modulation and coding scheme (MCS) of the dominant interference is higher than that of the desired user. As a result the probability of correct detection of the dominant interference is quite limited, and there is not much margin for post-decoding IC cancelling of the inter-cell interference.

The above-referenced R1-093239 proposes a so-called multi-layered rate control (MLRC) where the eNB controls the transmission rate of parts of its data layers such that the controlled part becomes decodable by the cell edge users. It also proposes that scheduling information needs to be shared among eNBs to indicate the location of physical resource blocks (PRBs) over which MLRC is applied. However, the signaling arrangement is not specified.

The exemplary embodiments of this invention are directed at least in part to a downlink interference cancelling (IC) receiver arrangement in the context of cell-aggregation CoMP. These embodiments do not rely on any "private" and "common" portions of data being present as in, for example, the MLRC proposal found in R1-093239.

The exemplary embodiments of this invention provide a DL IC receiver arrangement on top of (used in conjunction with) cell-aggregation CoMP. This is achieved in the following manner.

(A) Coordinated scheduling is used among multiple transmission points. The scheduling ensures that the IC receiver has favorable operating conditions, e.g., a set of MCS is selected such that in a first phase at least one of the signals can be correctly decoded. Due to the presence of the IC receiver, the scheduling operation is not that sensitive to the precoding of the own/interfering signals and is more robust in the presence of non-ideal conditions.

(B) A specific resource allocation signaling is used for enabling/mandating intra-cell IC at the receiver end. The specific resource allocation signaling is based on the introduction of an IC-group, a specific C-RNTI (IC-C-RNTI) in which those UEs that are part of the same IC-group are able to receive DL resource allocation grants corresponding to all UEs in the IC-group.

Discussed now in further detail is the resource allocation signaling aspect of this invention.

Reference is made below to the ePDCCH. It should be noted that several working assumptions have been adopted for studying the ePDCCH. These assumptions include the introduction of an enhanced physical downlink control channel that is able to support increased control channel capacity, that is able to support frequency-domain ICIC, that is able to achieve improved spatial reuse of control channel resources, that is able to support beamforming and/or diversity, that is able to operate on a new carrier type and in MBSFN subframes, and that is able to coexist on the same carrier as legacy UEs. Desirable characteristics include an ability to be scheduled frequency-selectively, and an ability to mitigate inter-cell interference.

A method defines at least one IC-group-specific C-RNTI (IC-C-RNTI). Note that there can be multiple IC groups defined. The inter-cell IC operates within an IC group, and interference rejection combining (IRC) can be applied amongst multiple IC groups.

Those UEs configured to the inter-cell IC mode begin monitoring IC-C-RNTI. They may continue monitoring a current C-RNTI as well. The IC-C-RNTI may have a dedicated search space (i.e., specific to IC-C-RNTI rather than C-RNTI). The IC-C-RNTI may also utilize the ePDCCH. A Short UE_id (e.g., 3-8 bits, or a corresponding number of codepoints taken from some other fields in the DL assignment) are included in the DCI corresponding to the IC-C-RNTI that is the actual UE identification. It is noted that five bits can support as many as 32 UEs per interference cancellation group. The Short UE_id may be signaled to the UE by the serving eNB (or cell) when configuring the UE to the IC mode, or the UE may derive it itself based on its normal UE ID using, for example, a modulo operation. The IC-C-RNTI may be scheduled from the current serving cell, and cross-cell scheduling of the IC-C-RNTI may be used as well.

Figure 3:
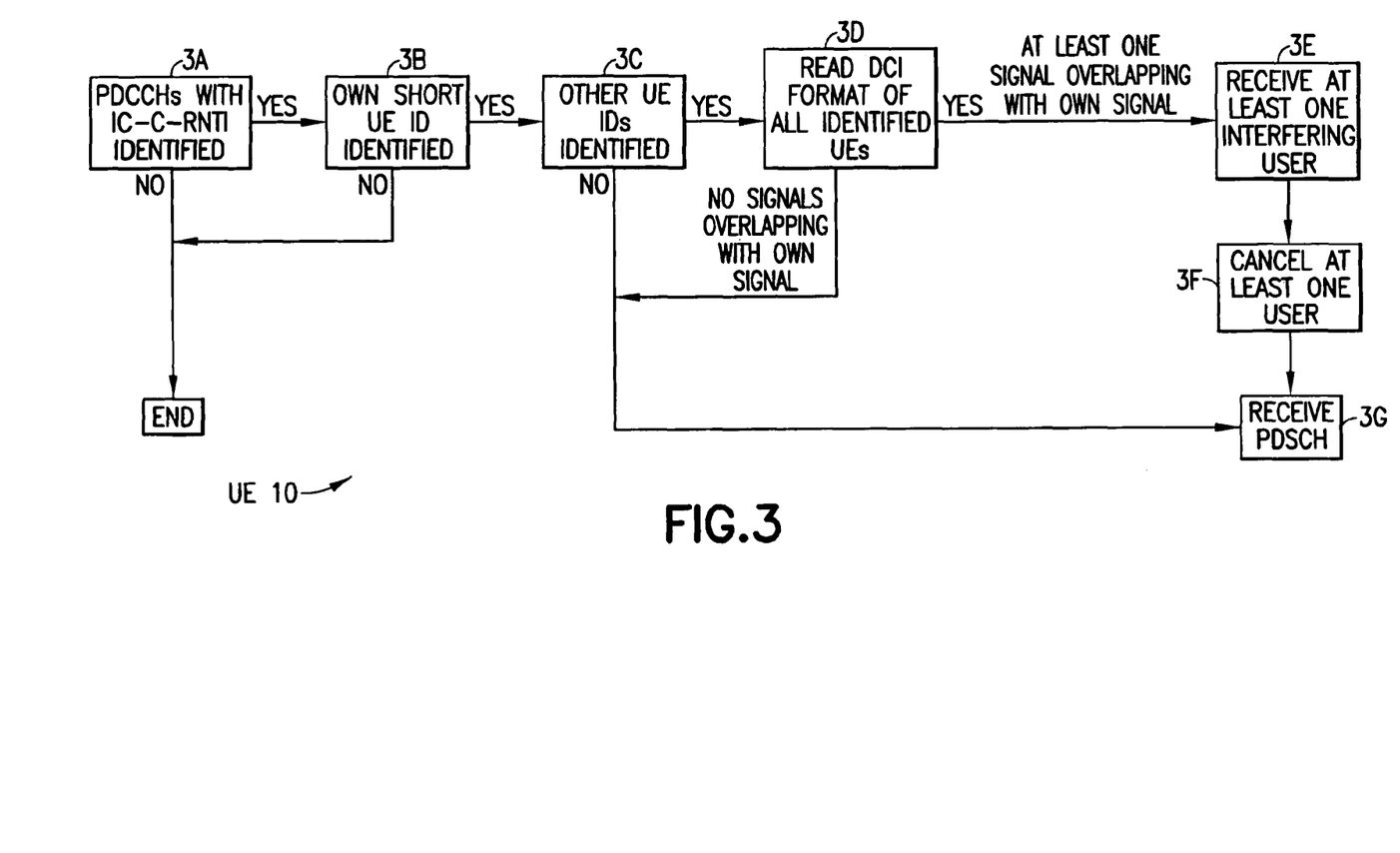
FIG. 3 is a block diagram that illustrates UE receiver operation in accordance with the exemplary embodiments of this invention.

The DCI transmitted using the IC-C-RNTI triggers the operations at the UE 10 as shown in FIG. 3. These operations include the following.

(a) The UE 10 reads the resource allocation corresponding to the desired UE (i.e., own signal) (Blocks 3A, 3B).

(b) The UE 10 reads resource allocation(s) corresponding to potential interferers under the same IC-group as well (Blocks 3C, 3D). Interfering signals with overlapping resources with respect to the desired UE 10 will trigger IC to be performed (Blocks 3E, 3F). The end result is receiving the PDSCH (Block 3G) containing desired DL data for the UE 10.

(c) All of the information needed to receive the interference signal can be read from IC-C-RNTI. The UE 10 attempts to decode a predetermined number of PDCCH DL assignments, and does not terminate this procedure when it finds (successfully decodes) a first one (as opposed to operation with the conventional PDCCH). It is also possible to explicitly signal the absence (or presence) of interfering UEs. Hence, in this specific scenario, the UE 10 can terminate the PDCCH decoding procedure when it finds an IC-C-RNTI with Short-ID corresponding to the desired UE.

(d) The RS (e.g., the DM RS) usage may be coordinated as well (i.e., a CRS-based approach can be used).

It should be noted that the procedure depicted in FIG. 3 can be modified in various ways. For example, in another exemplary embodiment the UE 10 can attempt to decode the PDSCH prior to entering the IC loop. Another example is that reception of the PDCCH with C-RNTI may terminate decoding attempts related to PDCCH (both C-RNTI and IC-C-RNTI).

When implementing the exemplary embodiments of this invention both the IC-C-RNTI and the Short UE_id can be configured via higher layers as part of IC configuration.

Figure 4:
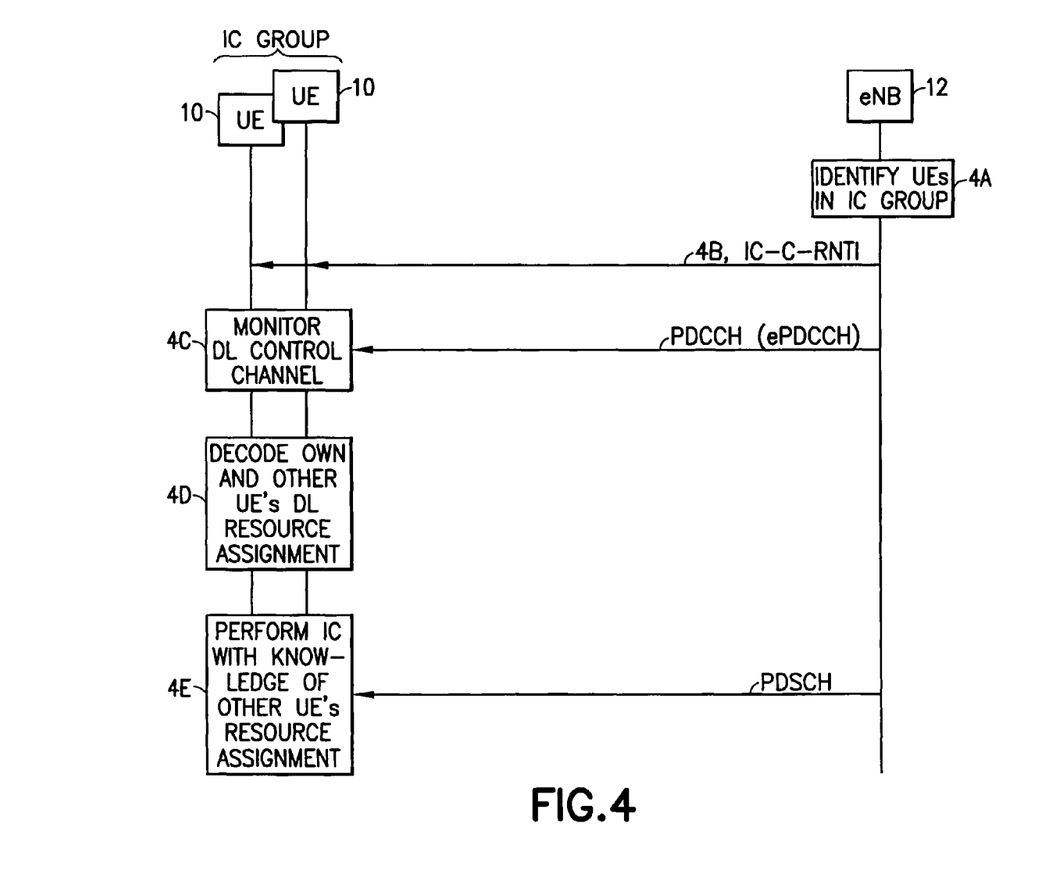
FIG. 4 depicts an example of a specific signaling/configuration procedure in accordance with the exemplary embodiments of this invention.

A non-limiting example of a specific signaling/configuration procedure includes the following steps in reference to FIG. 4.

(4A) The eNB 12 identifies the UEs 10 to be included into the IC operation (into a specific one of the IC groups) based on, for example, the UE receiver capability, CSI/RRM measurements, etc. This process can be referred to as "UE neighbor list creation".

(4B) The eNB 12 configures the UEs 10 to the IC mode and indicates to them via DL signaling their IC-C-RNTI (and potentially also the Short UE ID).

(4C) The UEs 10 begin monitoring the (e)PDCCH using the configured IC-C-RNTI.

(4D) When the UE 10 manages to decode a DL Assignment scrambled with the IC-C-RNTI, it checks the Short UE ID(s) as depicted in FIG. 3. In one embodiment the UE 10 does not terminate attempting to decode the DL Assignments even if it manages to successfully decode one. Instead the UE 10 goes through the entire search space allocated for IC DL Assignments (unlike with the conventional PDCCH operation).

(4E) Based on the information in the decoded DL Assignments (own plus interfering) the UE 10 gains knowledge of how to optimally perform IC.

Note in this regard that there may be some limitations related to IC operation. For example, the number of UEs 10 to be (interference) cancelled may be limited to one or two interfering UE(s). For this purpose there may be predefined rules to prioritize the UE(s) to be cancelled. The rules may in turn be defined, e.g., based on the amount of overlapping bandwidth and/or modulation and coding scheme (MCS) that is in use.

Figure 5:
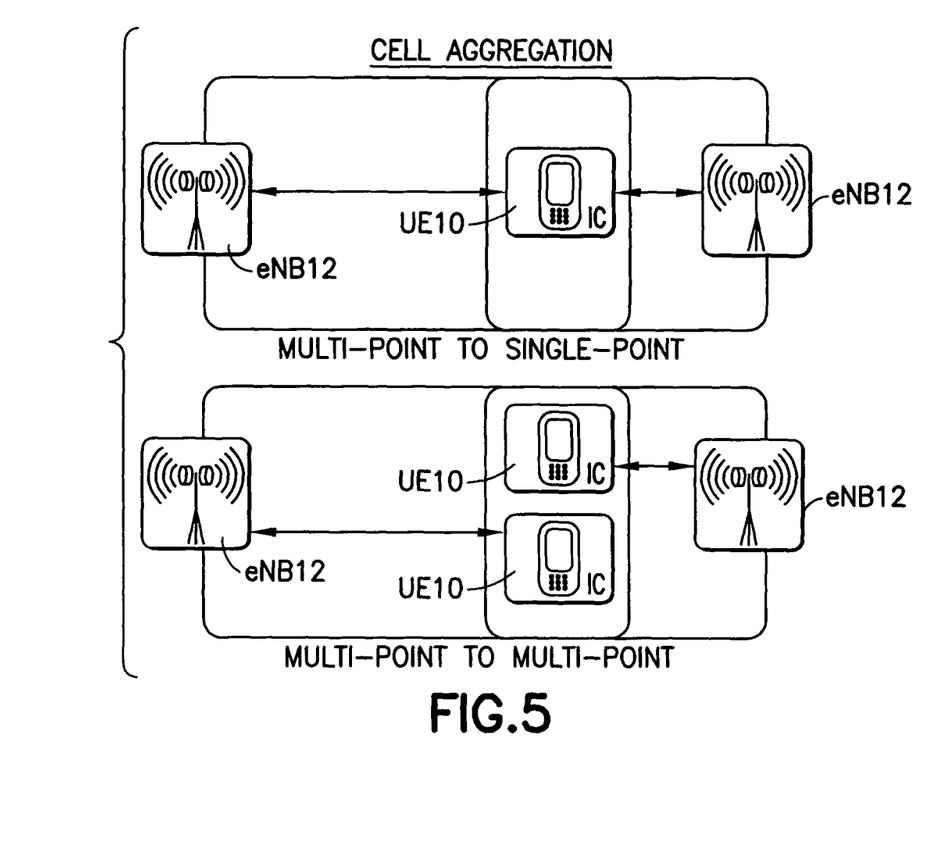
FIG. 5 shows two exemplary use cases of the exemplary embodiments of this invention, specifically a cell aggregation multi-point to single-point mode use case and a cell aggregation multi-point to multi-point mode use case.

The exemplary embodiments of this invention can be used in at least two different ways as shown in FIG. 5: a cell aggregation multi-point to single-point mode and a cell aggregation multi-point to multi-point mode. The exemplary embodiments of this invention can be used together with any MIMO technique, e.g., with intra-cell multiuser MIMO (MU-MIMO) and/or non-orthogonal access.

There are a number of exemplary advantages and technical effects that may be gained by the use of the various embodiment s of this invention. For example, the use of the various embodiments of this invention may enable increasing CoMP gains in the DL. As a further example, the use of the various embodiments of this invention may provide synergies with non-orthogonal access proposed for intra-cell interference cancellation (SIC operation is similar in both). As a further example, the various embodiments of this invention are not sensitive to non-idealities (such as CSI accuracy). As a further example, the use of the various embodiments of this invention may be viewed as a natural evolution for a cell-aggregation configuration. As yet another example, the use of the various embodiments of this invention provides a control signaling arrangement that enables maintaining the amount of DCI at reasonable level.

Figure 8:
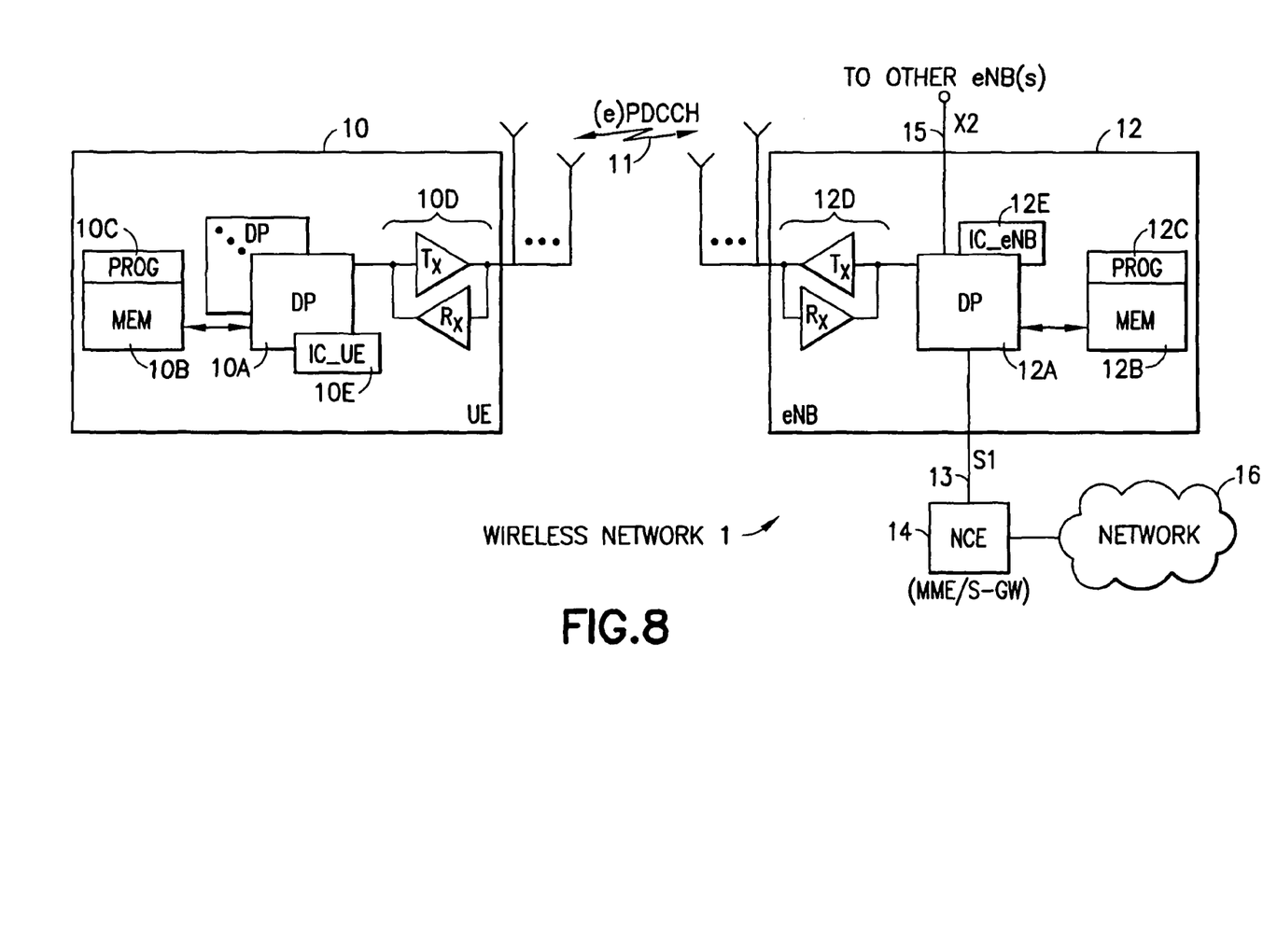
FIG. 8 is a block diagram showing apparatus that are configured to implement the exemplary embodiments of this invention.

Reference is made to FIG. 8 for illustrating a simplified block diagram of various electronic devices and apparatus that are suitable for use in practicing the exemplary embodiments of this invention. In FIG. 8 a wireless network 1 is shown, such as an LTE type of wireless network. Communication over a wireless link 11 is conducted between an apparatus, such as a mobile communication device which may be referred to as the UE 10, and a network access node, such as a Node B (base station), and more specifically the eNB 12. The network 1 may include a network control element (NCE) 14 that may include mobility management entity/serving gateway (MME/SGW) functionality, and which may provide connectivity with a further network, such as a telephone network and/or a data communications network (e.g., the interne). The UE 10 includes a controller, such as at least one computer or a data processor (DP) 10A, at least one non-transitory computer-readable memory medium embodied as a memory (MEM) 10B that stores a program of computer instructions (PROG) 10C, and at least one suitable radio frequency (RF) transmitter (Tx) and receiver (Rx) pair (transceiver) 10D for bidirectional wireless communications with the eNB 12 via one or more antennas.

The eNB 12 also includes a controller, such as at least one computer or a data processor (DP) 12A, at least one computer-readable memory medium embodied as a memory (MEM) 12B that stores a program of computer instructions (PROG) 12C, and at least one suitable RF transceiver 12D for communication with the UE 10 via one or more antennas (typically several when MIMO operation is in use). The eNB 12 is coupled via a data/control path 13 to the NCE 14. The path 13 may be implemented as an S1 interface. The eNB 12 may also be coupled to another eNB via data/control path 15, which may be implemented as an X2 interface. The wireless link 11 is assumed to include the downlink control channel, such as the PDCCH or ePDCCH, that is configured by the eNB 12 to contain the IC-related information needed by the UE 10 IC receiver (IC_Rx) that is part of the transceiver 10D.

For the purposes of describing the exemplary embodiments of this invention the UE 10 may be assumed to also include an interference cancellation unit or module (IC_UE) 10E, and the eNB 12 may include an interference cancellation unit or module (IC_eNB) 12E. The IC_UE 10E may operate as generally described herein with respect to FIGS. 3, 4, and 6, and the IC_eNB 12E may operate as generally described herein with respect to FIGS. 4 and 7.

The PROGs 10C and 12C may be assumed to include program instructions that, when executed by the associated DP, enable the device to operate in accordance with the exemplary embodiments of this invention as was described above. That is, the exemplary embodiments of this invention, including the IC_UE 10E and the IC_eNB 12E, may be implemented at least in part by computer software executable by the DP 10A of the UE 10 and/or by the DP 12A of the eNB 12, or by hardware, or by a combination of software and hardware (and firmware).

The various data processors, memories, programs, transceivers and interfaces depicted in FIG. 8 can all be considered to represent means for performing operations and functions that implement the several non-limiting aspects and embodiments of this invention.

In general, the various embodiments of the UE 10 can include, but are not limited to, cellular mobile devices, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer-readable memories 10B and 12B may be of any type suitable to the local technical environment and may be implemented using any suitable data storage technology, such as semiconductor based memory devices, random access memory, read only memory, programmable read only memory, flash memory, magnetic memory devices and systems, optical memory devices and systems, fixed memory and removable memory. The data processors 10A and 12A may be of any type suitable to the local technical environment, and may include one or more of general purpose computers, special purpose computers, microprocessors, digital signal processors (DSPs) and processors based on multi-core processor architectures, as non-limiting examples.

Based on the foregoing it should be apparent that the exemplary embodiments of this invention provide a method, apparatus and computer program(s) to enhance the interference cancellation operation of user equipment, such as in a cell aggregation CoMP environment.

Figure 6:
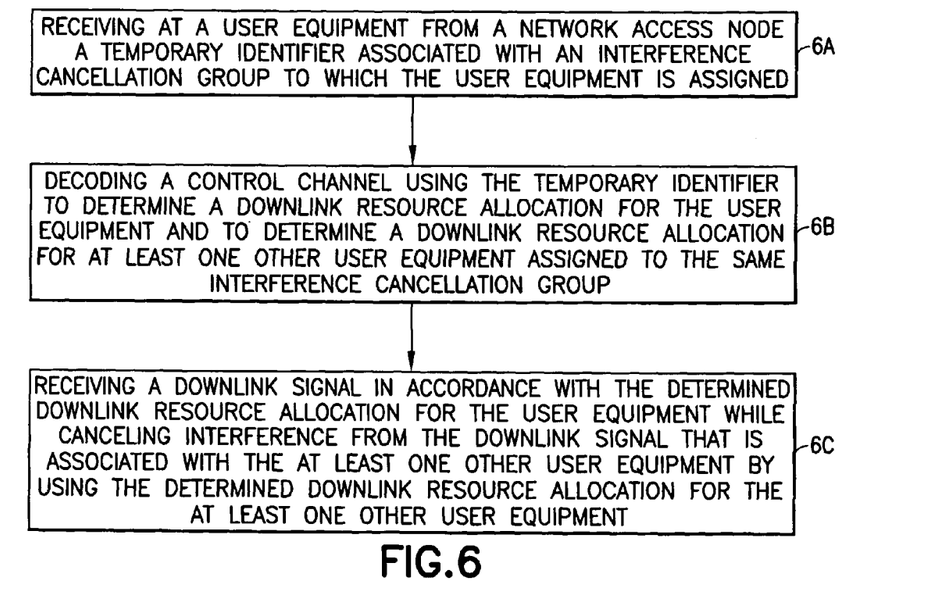
FIGS. 6 and 7 are each a logic flow diagram that illustrates the operation of a method, and a result of execution of computer program instructions, in accordance with the exemplary embodiments of this invention.

FIG. 6 is a logic flow diagram that illustrates the operation of a method, and a result of execution of computer program instructions, in accordance with the exemplary embodiments of this invention. In accordance with these exemplary embodiments a method performs, at Block 6A, a step of receiving at a user equipment from a network access node a temporary identifier associated with an interference cancellation group to which the user equipment is assigned. At Block 6B there is a step of decoding a control channel using the temporary identifier to determine a downlink resource allocation for the user equipment and to determine a downlink resource allocation for at least one other user equipment assigned to the same interference cancellation group. At Block 6C there is a step of receiving a downlink signal in accordance with the determined downlink resource allocation for the user equipment while canceling interference from the downlink signal that is associated with the at least one other user equipment by using the determined downlink resource allocation for the at least one other user equipment.

Figure 7:
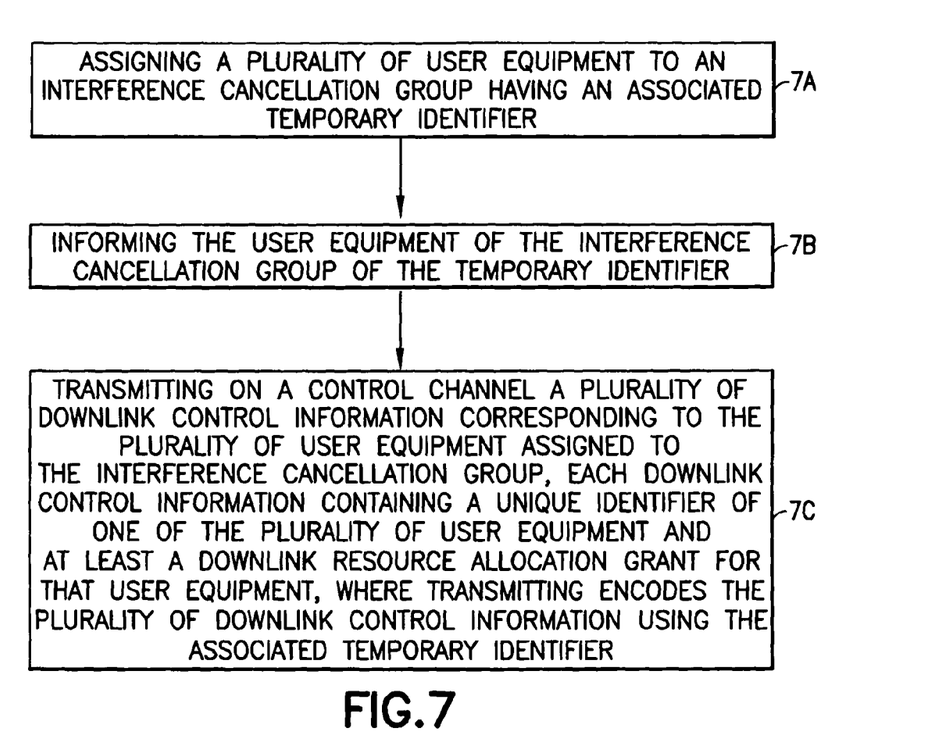

FIG. 7 is a logic flow diagram that illustrates the operation of a method, and a result of execution of computer program instructions, further in accordance with the exemplary embodiments of this invention. In accordance with these exemplary embodiments a method performs, at Block 7A, a step of assigning a plurality of user equipment to an interference cancellation group having an associated temporary identifier. At Block 7B there is a step of informing the user equipment of the interference cancellation group of the temporary identifier. At Block 7C there is a step of transmitting on a control channel a plurality of downlink control information corresponding to the plurality of user equipment assigned to the interference cancellation group, each downlink control information containing a unique identifier of one of the plurality of user equipment and at least a downlink resource allocation grant for that user equipment, where transmitting encodes the plurality of downlink control information using the associated temporary identifier.

The various blocks shown in FIGS. 6 and 7 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the cell aggregation CoMP type of system it should be appreciated that the exemplary embodiments of this invention are not limited for use with only this one particular type of wireless communication system, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters (e.g., IC-C-RNTI, Short UE_id, etc.) are not intended to be limiting in any respect, as these parameters may be identified by any suitable names. Further, the various names assigned to different channels (e.g., ePDCCH, PDSCH, etc.) are not intended to be limiting in any respect, as these various channels may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
   receiving, at a user equipment, from a network access node a temporary identifier associated with an interference cancellation group to which the user equipment is assigned;
   decoding, by the user equipment, a control channel using the temporary identifier to determine a downlink resource allocation for the user equipment and to determine a downlink resource allocation for at least one other user equipment assigned to the same interference cancellation group; and
   receiving, at the user equipment, a downlink signal in accordance with the determined downlink resource allocation for the user equipment while canceling interference from the downlink signal that is associated with the at least one other user equipment by using the determined downlink resource allocation for the at least one other user equipment,
   wherein canceling the interference is performed by the user equipment for a case where the determined downlink resource allocation of another user equipment in the same interference cancellation group overlaps the determined downlink resource allocation of the user equipment.

2. The method of claim 1, where decoding the control channel decodes downlink control information, and where a first downlink control information comprises an identification of the user equipment that is associated with the downlink resource allocation for the user equipment, and where a second downlink control information comprises an identification of the at least one other user equipment that is associated with the downlink resource allocation for the at least one other user equipment.

3. The method of claim 2, where the user equipment after successfully decoding a first downlink control channel information continues to attempt to decode one or more additional control channel information.

4. The method as in claim 1, where the control channel is one of a physical downlink control channel and an enhanced physical downlink control channel.

5. The method as in claim 1, where the user equipment is operated in either a multi-point to single point mode or in a multi-point to multi-point mode.

6. The method as in claim 1, where the user equipment is operated in a mode configured to cancel multi-user interference originating from at least one of an own-cell of the user equipment and from another cell or cells.

7. A non-transitory computer-readable medium that contains software program instructions, where execution of the software program instructions by at least one data processor results in performance of operations that comprise execution of the method of claim 1.

8. An apparatus comprising:
a processor; and
a memory including computer program code, the memory and computer program code are being configured, with the processor, to cause the apparatus, said apparatus being a user equipment, to perform at least the following:
receive from a network access node a temporary identifier associated with an interference cancellation group to which the apparatus is assigned;
decode a control channel using the temporary identifier to determine a downlink resource allocation for the apparatus and to determine a downlink resource allocation for at least one other user equipment assigned to the same interference cancellation group; and
receive a downlink signal in accordance with the determined downlink resource allocation for the apparatus and cancel interference from the downlink signal that is associated with the at least one other user equipment by using the determined downlink resource allocation for the at least one other user equipment,
wherein canceling the interference is performed by the apparatus for a case where the determined downlink resource allocation of another user equipment in the same interference cancellation group overlaps the determined downlink resource allocation of the apparatus.

9. The apparatus as in claim 8, where decoding the control channel decodes downlink control information, and where a first downlink control information comprises an identification of the apparatus that is associated with the downlink resource allocation for the apparatus, and where a second downlink control information comprises an identification of the at least one other user equipment that is associated with the downlink resource allocation for the at least one other user equipment.

10. The apparatus as in claim 8, where the control channel is one of a physical downlink control channel and an enhanced physical downlink control channel.

11. The apparatus as in claim 8, where the apparatus is operated in either a multi-point to single point mode or in a multi-point to multi-point mode.

12. The apparatus as in claim 8, where the apparatus is operated in a mode configured to cancel multi-user interference originating from at least one of an own-cell of the user equipment and from another cell or cells.

13. The apparatus as in claim 9, where the apparatus after successfully decoding a first downlink control channel information continues to attempt to decode one or more additional control channel information.

* * * * *